United States Patent [19]

Lansbergen

[11] Patent Number: 4,521,440

[45] Date of Patent: Jun. 4, 1985

[54] WATER-IN-OIL EMULSIONS

[75] Inventor: Gabriël J. T. Lansbergen, s'Gravenzande, Netherlands

[73] Assignee: Lever Brothers Company, New York, N.Y.

[21] Appl. No.: 566,123

[22] Filed: Dec. 27, 1983

[30] Foreign Application Priority Data

Dec. 30, 1982 [NL] Netherlands .......................... 8205047

[51] Int. Cl.³ .......................... A23D 3/00; A23D 3/02; A23D 5/00
[52] U.S. Cl. .................................... 426/602; 426/603; 426/607
[58] Field of Search ................ 426/606, 602, 607, 603

[56] References Cited

U.S. PATENT DOCUMENTS

| | | |
|---|---|---|
| 3,353,964 | 11/1967 | Seiden . |
| 3,617,308 | 11/1971 | Graffelman ...................... 426/607 X |
| 3,956,522 | 5/1976 | Kattenberg et al. ............ 426/607 X |
| 4,341,813 | 7/1982 | Ward ............................... 426/607 X |
| 4,386,111 | 5/1983 | Van Heteren et al. .......... 426/607 X |

FOREIGN PATENT DOCUMENTS

| | | |
|---|---|---|
| 816514 | 7/1959 | United Kingdom . |
| 1102944 | 2/1968 | United Kingdom . |
| 1382573 | 2/1975 | United Kingdom . |

Primary Examiner—Robert Yoncoskie
Attorney, Agent, or Firm—Milton L. Honig; James J. Farrell

[57] ABSTRACT

The present invention relates to water-in-oil emulsion-spreads of the print margarine type containing a hard fat component obtained by random interesterification of substantially saturated triglycerides rich in lauric fats. Such a hard fat component imparts to the emulsions a consistency which is higher than could be expected on the ground of their solid fat content and enables the incorporation of a relatively large amount of liquid oils of the polyunsaturated type in said print margarines.

30 Claims, No Drawings

WATER-IN-OIL EMULSIONS

The present invention relates to water-in-oil emulsions, particularly to print margarines and low calorie spreads containing as hard fat component an interesterified mixture of substantially saturated trigylcerides. The invention further relates to margarine fats suitably for the preparation of print margarines and containing the abovementioned hard fat component.

As compared to tub margarines, print margarines comprise a fat blend containing a relatively high percentage, i.e. usually more than 15% and preferably 20-50% of relatively high-melting fats (so-called hardstock fats), i.e. fats having a melting point about 25° C. and preferably above 30° C. These fats impart consistency to the product and form a firm matrix in which liquid oil is occluded.

High-melting fats often have the drawback of melting too slowly on consumption and leaving an unpleasent waxy feel in the mouth. Another drawback is that, like fats containing trans fatty acids, they are physiologically less suitable than fats containing poly-unsaturated fatty acids. There is therefore a need of "print margarines" which have a ratio of poly-unsaturated fatty acids to saturated+trans fatty acids [hereafter indicated by $P/(S+T)$] that is physiologically more acceptable than said ratio in commonly marketed print margarines, and also have good organoleptic properties.

The most obvious solution to meet this need is to incorporate in the margarine blend a relatively large amount of oils that are rich in poly-unsaturated fatty acids. However, the products obtained thereby are too soft at ambient temperature for print margarines, whilst being suitable for use in margarines of the type to be packed in tubs.

We have now found W/O emulsions having an improved $P/(S+T)$ ratio, which are characterized by containing a hard fat component or hardstock imparting a specific structure which gives the emulsion a higher consistency than was to be expected on the ground of its total solid fat content.

The use of the hard fat component to be defined below makes it possible to incorporate in a margarine fat blend a relatively large amount of oils containing poly-unsaturated fatty acid residues and still obtain an adequate consistency for packing the product in wrappers.

The hard fat component used in the W/O emulsions according to the invention comprises a mixture of triglycerides obtained by random interesterification of a fat (a) which is rich in $C_8$–$C_{14}$-fatty acid residues, in substantially completely hydrogenated form with itself or in non-hydrogenated form with a second fat (b) in which 40-100% of the fatty acid residues are saturated and mainly contain 16-22 carbon atoms.

Fat (a) preferably contains coconut, palm kernel, babassu, murumuru, tucum, ouricurum or butter fat, fractions of these fats or mixtures of these fats and fat fractions. If these fats are present as hydrogentated fats, their iodine value is preferably lower than 10 and ideally lower than 5, which corresponds with substantially completely hydrogenated fats.

A fraction of fat (a) preferably consists of a hydrogenated olein fraction of one or more of the fats to be considered for fat (a). This olein fraction can be obtained by dry fractionation (in the absence of a solvent), by wet fractionation (in the presence of an organic solvent such as acetone or hexane) or by a so-called Lanza fractionation (in the presence of an aqueous solution of a surface-active substance).

The olein fraction consist of a low-melting fraction obtained by fractionating one of the fats to be considered for fat (a), e.g. palm kernel fat, in acetone at 0°–10° C.

It is however also possible to produce an olein fraction of fat (a) by dry-fractionation. For palm kernel fat fractionation at 15°–25° C. is suitable.

As examples of fats to be considered for fat (b) are mentioned: hydrogenated soybean oil, rapeseed oil, sunflower oil, safflower oil, cottonseed oil, corn oil, palm oil, or mixtures of these oils, in which 40-100% of the fatty acid residues are saturated.

Fat (b) preferably consists of soybean oil hydrogenated to a melting point of 65° C.

According to a preferred embodiment of the invention the fat suitable as hard fat component for print margarines comprises a mixture of triglycerides obtained by random interesterification of exclusively completely hydrogenated fat (a).

According to another preferred embodiment the fat suitable as hard fat component in print margarines comprises a mixture of triglycerides obtained by random interesterification of exclusively a hydrogenated olein or fat (a).

The hard fat component can, for example, consist of a mixture of triglycerides obtained by random interesterification of 60-90% of a non-hydrogenated fat (a) with 10-40% of fat (b).

The preferred hard fat components according to the invention are randomly interesterified palm kernel fat having a melting point of 39° C., a randomly interesterified olein of palm kernel fat hydrogenated to a melting point of 41° C., and a randomly interesterified mixture of coconut fat with soybean oil hydrogenated to a melting point of 65° C.

The fats according to the invention which are suitable for use as hard fat component for print margarines have a solid fat content ranging at 10° C. from 75 to 100%, at 20° C. preferably from 40 to 75%, at 30° C. from 10 to 20%, and at 35° C. from 0 to 7%, preferably from 0 to 3%.

A further characteristic of the hard fat components is their content of triglycerides derived from 2 saturated $C_{16}$–$C_{22}$ fatty acids and one saturated $C_{12}$–$C_{14}$ fatty acid [abbreviated ($H_2M$)]. This content may vary from 8 to 20%, preferably from 9 to 18%. Another characteristic of the hard fat components is their content of triglycerides derived from 1 saturated $C_{16}$–$C_{22}$ fatty acid and 2 saturated $C_{12}$–$C_{14}$ fatty acids [abbreviated ($HM_2$)]. This content may vary from 18 to 35%, preferably from 20 to 32%.

A final important characteristic of the hard fat components is their content of triglycerides derived from 3 saturated $C_{12}$–$C_{14}$ fatty acids. This content may vary from 11 to 40%, preferably from 12 to 34%.

The ratio of triglycerides derived from 2 saturated $C_{16}$–$C_{22}$ fatty acids and 1 saturated $C_{12}$–$C_{14}$ fatty acid to the triglycerides derived from 1 saturated $C_{16}$–$C_{22}$ fatty acid and 2 saturated $C_{12}$–$C_{14}$ fatty acids preferably lies between 0.3 to 0.6.

With respect to the fatty acid composition of the hard fat component the following characteristics are of importance:

Saturated $C_8$–$C_{14}$ fatty acid content: 45–75%, preferably 50–70%.

Saturated $C_{16}$–$C_{22}$ fatty acid content: 24–40%, preferably 26–36%.

The ratio of the saturated $C_{16}$–$C_{22}$ fatty acids to the saturated $C_8$–$C_{14}$ fatty acids preferably lies between 0.4 and 0.6.

A suprisingly effect achieved by the hard fat components defined above is the fact that the consistency of hardness imparted by them by them to the O/W emulsion is higher than could be expected on the ground of their solid fat content. A useful parameter for this is the $C/N^2$ ratio, in which C indicates the hardness in g/cm², measured at a certain temperature (preferably 20° C.), and N is the solid fat content determined by nuclear magnetic resonance at the same temperature.

For normal commercial print margarines this ratio at 20° C. lies at about 0.5, whereas the hard fat components of the invention have a ratio of at least 0.7, preferably between 1.1 to 2.5.

A consequence of this is that a smaller amount of hard fat component is required in the margarine, implying that per quantity by weight of hard fat component a larger quantity of liquid oil of the poly-unsaturated type (containing linoleic acid) can be used while maintaining the required hardness at 20° C., which should have a minimum value of 100 g/cm² and preferably range between 200 and 700 g/cm².

An important characteristic of the margarine fat blends according to the invention containing the hard fat components of the invention is their linoleic acid: saturated fatty acids: trans fatty acids ratio [P/(S+T)].

The print margarine fat blends according to the invention have a higher P/(S+T) ratio than the commonly marketed margarines. The P/(S+T) ratio of the margarine fats according to the invention is at least 0.4 and preferably lies between 0.5 and 1.

These ratios are obtained by preparing margarine fat blends containing from 15 to 60%, preferably 20–40% of hard fat component according to the invention and from 40 to 85%, preferably 60–80% of an oil which does not substantially contribute to the consistency of the margarine fat within the temperature range of 5° to 35° C. At 10° C. this oil is substantially free of solid fat crystals and it preferably consists of an oil which is rich in poly-unsaturated fatty acids (linoleic acid), preferably containing 40% or more of linoleic acid, such as sunflower oil, safflower oil, rapeseed oil, soybean oil, corn germ oil, cotton seed oil and the like.

The margarine fats can also optionally contain 0–25% of non-interesterified fats such as palm fat, soybean oil or rapeseed oil, which may be partially hardened, while care should be taken to ensure that the total margarine fat blend preferably satisfies the following solid fat profile:

$N_{10}$ = 25–55
$N_{20}$ = 10–25
$N_{30}$ = 1–7
$N_{35}$ ≦ 2

Water-in-oil emulsions and low calorie spreads to be packed in wrappers can be prepared in a manner known per se, starting from a margarine fat blend according to the invention which is emsulified with an aqueous phase, after which the emulsion is subjected to cooling and texturising treatments to obtain a plastic product. These treatments are advantageously carried out in, for example, a Votator ® apparatus.

the invention will now be further illustrated by the following examples, in which the trans fatty acid content is determined according to the method described in J.A.O.C.S. 54, 47 (1971) as elaidic acid content (isolated mono-trans), the hardness of the margarines according to the method described in J.A.O.C.S. 36 (1959), pp. 345–348, and the solid fat content (expressed in NMR-values) according to the method described in Fette, Seifen, Anstrichmittel 80, 180–186 (1978). The fatty acid compositions are determined by means of gas-liquid chromatography after conversion of glycerol esters into methyl esters.

The triglyceride composition is determined by means of a calculation technique based on the statistic distribution of the fatty acids on the glycerol molecule after interesterification.

EXAMPLE I

An interesterification hard fat component was prepared by random interesterification of a mixture of 77% coconut fat and 23% soybean oil, hardened to a melting point of 65° C. 25% of the randomly interestertified mixture was mixed with 52% non-hydrogenated soybean oil and 23% rapeseed oil hardened to a melting point of 36° C., resulting in a margarine fat blend with the following solid fat profile:

$N_{10}$ = 29.5
$N_{20}$ = 12
$N_{30}$ = 1.5
$N_{35}$ = 0.5.

Trans fatty acid content: 15%; linoleic acid content: 27.6%. The P/(S+T) ratio was 0.54.

A print margarine was prepared by emulsifying 16% of an aqueous phase with 84% of the above-described margarine fat blend and subsequently cooling and working the emulsion in a Votator ® apparatus.

The C-value of the margarine, measured at 20° C., was about 260 g/cm². The $C/N^2$ ratio, measured at 20° C., was about 1.8.

EXAMPLE II

An interesterified hard fat component was prepared by dry-fractionation of palm kernel fat at 20° C., in which the low-melting olein was separated and subsequently hydrogenated at 41° C. The hardened olein was subsequently subjected to random interesterification.

A margarine fat blend was prepared by mixing 25 wt. % of the hardened olein with 52% of soybean oil and 23% of rapeseed oil hardened to 36° C. The margarine fat blend had the following solid fat profile:

$N_{10}$ = 32; $N_{20}$ = 14.5; $N_{30}$ = 2; $N_{35}$ = 0.5.

The linoleic acid content was 27.6%; the P/(S+T) ratio was 0.53. The trans fatty acid content amounted to 15%.

A print margarine could be prepared by emulsifying 16% of an aqueous phase with 84% of the above-described margarine fat blend and subsequently cooling and working the emulsion in a Votator-apparatus.

The C-value, measured at 20° C., was about 270 g/cm²; the $C/N^2$ ratio was about 1.3.

EXAMPLE III

A hard fat component was prepared by hydrogenating palm kernel fat to 39° C. and subsequently subjecting it to random interesterification.

A margarine fat blend was prepared starting from 29% of the above-mentioned hard fat component, 50% of soybean oil, 11% of soybean oil hydrogenated to a melting point of 36° C., and 10% of soybean oil hydrogenated to a melting point of 45° C. The margarine fat blend had the following solid fat profile:

$N_{10}=35$; $N_{20}=15.5$; $N_{30}=2.0$; $N_{35}=0$.

The linoleic acid content was 26.5%; the trans fatty acid content 12%, and the P/(S+T) ratio 0.48.

A print margarine could be prepared by emulsifying 16% of an aqueous phase with 84% of the above-described margarine fat blend and subsequently cooling and working the emulsion in a Votator apparatus. The C-value, measured at 20° C., was 355 g/cm² and the C/N² ratio at 20° C. was 1.5.

EXAMPLE IV

A margarine fat blend was prepared starting from 52 wt. % of soybean oil, 15% wt. % of rapeseed oil hydrogenated to a melting point of 43° C., and 33 wt. % of a mixture of trigylcerides obtained by random interesterification of a mixture of 77 wt. % of coconut oil and 23 wt. % of soybean oil hardened to a melting point of 65° C.

The solid fat profile was as follows:

$N_{10°\ C.}=34.5$; $N_{20°\ C.}=17$; $N_{30°C}=3.5$; $N_{35°\ C.}=0.5$.

The trans fatty acid content of the mixture was 8%. The P/(S+T) ratio was 0.54.

A print margarine was prepared by emulsifying 16% of an aqueous phase with 84% of the above-described margarine fat blend and then cooling and working the emulsion in a Votator ® apparatus.

The hardness at 20° C. was 375 g/cm² and the C/N² ratio, measured at 20° C., was 1.93.

Analytical data regarding the interesterification hard fat components used in Example I, II, III and IV are summarized in Table I.

TABLE I

| | Interesterified hard fat components | | | |
|---|---|---|---|---|
| | of Ex. I | Ex II | Ex. III | Ex. IV |
| $C_8$ | 5 | 5–7 | 3 | 5 |
| $C_{10}$ | 4 | 4–5 | 3 | 4 |
| $C_{12}$ | 35 | 42–43 | 46 | 35 |
| $C_{14}$ | 14 | 12–12 | 17 | 14 |
| $C_{16} + C_{18}$ | 33 | 35–33 | 29 | 33 |
| $C_{18.1}$ | 7 | 1–0 | 1 | 7 |
| $C_{18.2}$ | 2 | 1–0 | 1 | 2 |
| Triglyceride composition | | | | |
| $H_3$ | 2 | 1 | 3–2 | 2 |
| $H_2M$ | 13 | 10 | 17–14 | 13 |
| $H_2U/H_2Sh$ | 5 | 2 | 4–3 | 5 |
| HME | 1 | | | 1 |
| $HM_2$ | 22 | 30 | 29–31 | 22 |
| $E_2M + EM_2$ | 0 | | | 0 |
| $M_3$ | 14 | 29 | 16–22 | 14 |
| remainder | 45 | 28 | 31–28 | 45 |
| $N_{10}$ | 80 | 88 | 84–89 | 80 |
| $N_{20}$ | 52 | 68 | 60–70 | 52 |
| $N_{30}$ | 16 | 13 | 13 | 16 |
| $N_{35}$ | 1.5 | 0.5 | 1–3 | 1.5 |

H = saturated $C_{16}$-$C_{22}$ fatty acid
M = saturated $C_{12}$-$C_{14}$ fatty acid
U = unsaturated $C_{14}$-$C_{18:2}$ fatty acid
E = elaidic fatty acid.
Sh = saturated $C_8$-$C_{10}$ fatty acid The compositions of the most important triglycerides in the total fat blends of Example I and Example IV are summarized in Table II.

TABLE II

| Composition of the most important triglycerides | Ex. I | Ex. IV |
|---|---|---|
| $H_3$ | 0.6 | 1.1 |
| $H_2E$ | 1.4 | 1.8 |
| $H_2M$ | 3.2 | 4.3 |
| $H_2U + H_2Sh$ | 4.7 | 5.6 |
| $HE_2$ | 4.9 | 2.4 |
| HME | 0.3 | 0.3 |
| $HM_2$ | 5.5 | 7.3 |
| $E_3$ | 3.6 | 1.1 |
| $M_3$ | 3.5 | 4.7 |
| remainder (triglycerides from oils which do not contribute to the structure of the total fat) | 73.2% | 71.4% |

I claim:

1. Edible water-in-oil emulsion comprising an aqueous phase emulsified in a fat phase, fat constituting 30 to 84% by weight of the total emulsion and comprising:
   (i) b 15–60% of a structure-imparting hard fat component, consisting essentially of a mixture of triglycerides obtained by random interesterification of a substantially completely hydrogenated fat (a) which is rich in $C_8$-$C_{14}$ fatty acid residues or by random interesterification of 60–90% of a non-hydrogenated fat (a) and 10–40% of a fat (b) in which 40–100% of the fatty acid residues are saturated and mainly contain 16–22 carbon atoms;
   (ii) 40–85% of an oil which does not substantially contribute to the consistency of the emulsion within the temperature range from 5° to 35° C. and which is substantially free of solid fat crystals at 10° C;
   (iii) 0–25% of an oil hydrogenated to a melting point of from 30° to 45° C.; and wherein the ratio of linoleic acid to the sum of saturated and trans fatty acids is at least 0.4 and the sum of components (i), (ii) and (iii) being equal to 100%.

2. Water-in-oil emulsion according to claim 1, wherein fat (a) is selected from the group consisting of coconut, palm kernel, babassu, murumuru, tucum, ouricurum, butter fat, fractions of these fats and mixtures thereof.

3. Water-in-oil emulsion according to claim 1, wherein fat (a) has been hydrogenated to an iodine value of less than 10.

4. Water-in-oil emulsion according to claim 2, wherein fat (a) consists of a low-melting olein which has been subjected to hydrogenation.

5. Water-in-oil emulsion according to claim 4, wherein the olein fraction has been obtained by fractionating a fat selected from the group consisting of coconut, palm kernel, babassu, murumuru, tucum, ouricurum and butter fat.

6. Water-in-oil emulsion according to claim 4, wherein the olein fraction has been obtained by dry-fractionating palm kernel fat at a temperature of 15°–25° C.

7. Water-in-oil emulsion according to claim 1, wherein fat (b) consists of hydrogenated soybean oil rapeseed oil, sunflower oil, safflower oil, cottonseed oil, corn oil, olive oil or mixtures thereof, in which 40–100% of the fatty acid residues consist of saturated fatty acids.

8. Water-in-oil emulsion according to claim 1, wherein fat (b) consists of soybean oil having a melting point of 65° C.

9. Water-in-oil emulsion according to claim 1, wherein the hard fat component displays the following solid fat profile:

$N_{10}=75$–100; $N_{20}=40$–75; $N_{30}=10$–20; $N_{35}=0$–3%.

10. Water-in-oil emulsion, according to claim 1 wherein the hard fat component has a content of triglycerides derived from 2 saturated $C_{16}$–$C_{22}$ fatty acids and 1 saturated $C_{12}$–$C_{14}$ fatty acid ranging from 8 to 20%, a content of triglycerides derived from 1 saturated $C_{16}$–$C_{22}$ fatty acid and 2 saturated $C_{12}$–$C_{14}$ fatty acids ranging from 18 to 35%, and a content of triglycerides derived from 3 saturated $C_{12}$–$C_{14}$ fatty acids ranging from 11 to 40%.

11. Water-in-oil emulsion according to claim 10, wherein the hard fat component has a ratio of triglycerides derived from 2 saturated $C_{16}$–$C_{22}$ fatty acids and 1 saturated $C_{12}$–$C_{14}$ fatty acid to triglycerides derived from 1 saturated $C_{16}$–$C_{22}$ fatty acid and and 2 saturated $C_{12}$–$C_{14}$ fatty acids ranging between 0.3 and 0.6.

12. Water-in-oil emulsion according to claim 10, wherein the hard fat component has a saturated $C_{12}$–$C_{14}$ fatty acid content ranging from 45 to 75% and a saturated $C_{16}$–$C_{22}$ fatty acid content ranging from 24 to 40%.

13. Water-in-oil emulsion according to claim 10, wherein the ratio of the saturated $C_{18}$–$C_{22}$ fatty acids to the saturated $C_{12}$–$C_{14}$ fatty acids in the hard fat component ranges between 0.4 and 0.6.

14. Water-in-oil emulsion according to claim 1, characterized by a $C/N^2$ ratio of 0.7 to 2.5 wherein the hardness C in $g/cm^2$ and the solid fat content N in % have both been measured at 20° C.

15. Water-in-oil emulsion according to claim 1, characterized by a hardness C of 100 to 700 $g/cm^2$ measured at 20° C.

16. Margarine fat comprising:
(i) 15–60% of a hard fat component consisting essentially of a mixture of triglycerides obtained by random interesterification of a substantially completely hydrogenated fat (a) rich in $C_8$–$C_{14}$ fatty acid residues or by random interesterification of 60–90% of a non-hydrogenated fat (a) and 10–40% of a fat (b) in which 40–100% of the fatty acid residues are saturated and mainly contain 16–22 carbon atoms;
(ii) 40–85% of an oil which does not substantially contribute to the consistency of the margarine within the temperature range from 5° to 35° C. and which is substantially free of solid fat crystals at 10° C;
(iii) 0–25% of an oil hydrogenated to a melting point of from 30° to 45° C.; and
wherein the ratio of linoleic acid to the sum of saturated and trans fatty acid is at least 0.4 and the sum of components (i), (ii) and (iii) being equal to 100%.

17. Margarine fat according to claim 16, wherein fat (ii) consists of an oil of which at least 40% of the fatty acid residues consist of linoleic acid.

18. Margarine fat according to claim 16, wherein the weight ratio of the various fat components (i), (ii) and (iii) is such that the ratio of linoleic acid to the sum of the saturated fatty acids and any trans fatty acids present ranges between 0.5 to 1.1.

19. A margarine fat according to claim 16 wherein fat (a) is selected from the group consisting of coconut, palm kernel, babassu, murumuru, tucum, ouricurum, butter fat, fractions of these fats and mixtures thereof.

20. A margarine fat according to claim 16 wherein fat (a) has been hydrogenated to an iodine value of less than 10.

21. A margarine fat according to claim 19 wherein fat (a) consists of a low-melting olein which has been subjected to hydrogenation.

22. A margarine fat according to claim 21 wherein the olein fraction has been obtained by fractionating a fat selected from the group consisting of coconut, palm kernel, babassu, murumuru, tucum, ouricurum and butter fat.

23. A margarine fat according to claim 21 wherein the olein fraction has been obtained by dry-fractionating palm kernel fat at a temperature of 15°–25° C.

24. A margarine fat according to claim 16 wherein fat (b) consists of hydrogenated soybean oil, rapeseed oil, sunflower oil, safflower oil, cottonseed oil, corn oil, olive oil or mixtures thereof, in which 40–100% of the fatty acid residues consist of saturated fatty acids.

25. A margarine fat according to claim 16 wherein fat (b) consists of soybean oil having a melting poin of 65° C.

26. A margarine fat according to claim 16 wherein the hard fat component displays the following solid fat profile;
$N_{10} = 75$–$100$; $N_{20} = 40$–$75$; $N_{30} = 10$–$20$; $N_{35} = 0$–$3\%$.

27. A margarine fat according to claim 16 wherein the hard fat component has a content of triglycerides derived from 2 saturated $C_{16}$–$C_{22}$ fatty acids and 1 saturated $C_{12}$–$C_{14}$ fatty acid ranging from 8 to 20%, a content of triglycerides derived from 1 saturated $C_{16}$–$C_{22}$ fatty acid and 2 saturated $C_{12}$–$C_{14}$ fatty acids ranging from 18 to 35%, and a content of triglycerides derived from 3 saturated $C_{12}$–$C_{14}$ fatty acids ranging from 11 to 40%.

28. A margarine fat according to claim 27 wherein the hard fat component has a ratio of triglycerides derieved from 2 saturated $C_{16}$–$C_{22}$ fatty acids and 1 saturated $C_{12}$–$C_{14}$ fatty acid to triglycerides derived from 1 saturated $C_{16}$–$C_{22}$ fatty acid and 2 saturated $C_{12}$–$C_{14}$ fatty acids ranging between 0.3 to 0.6.

29. A margarine fat according to claim 27 wherein the hard fat component has a saturated $C_{12}$–$C_{14}$ fatty acid content ranging from 45 to 75% and a saturated $C_{16}$–$C_{22}$ fatty acid content ranging from 24 to 40%.

30. A margarine fat according to claim 27 wherein the ratio of the saturated $C_{18}$–$C_{22}$ fatty acids to the saturated $C_{12}$–$C_{14}$ fatty acids in the hard fat component ranges between 0.4 and 0.6.

* * * * *